(12) United States Patent
Cherry et al.

(10) Patent No.: US 10,190,500 B2
(45) Date of Patent: Jan. 29, 2019

(54) DUCT

(71) Applicant: ROLLS-ROYCE PLC, London (GB)

(72) Inventors: Jonathan Antony Cherry, Bristol (GB); Paul Robert Hayton, Bristol (GB)

(73) Assignee: ROLLS-ROYCE plc, London (GB)

(*) Notice: Subject to any disclaimer, the term of this patent is extended or adjusted under 35 U.S.C. 154(b) by 158 days.

(21) Appl. No.: 14/711,402

(22) Filed: May 13, 2015

(65) Prior Publication Data
US 2015/0361892 A1 Dec. 17, 2015

(30) Foreign Application Priority Data
Jun. 13, 2014 (GB) .................................. 1410586.0

(51) Int. Cl.
*F02C 7/20* (2006.01)
*F02K 1/82* (2006.01)
*F01D 25/24* (2006.01)

(52) U.S. Cl.
CPC .............. *F02C 7/20* (2013.01); *F01D 25/24* (2013.01); *F02K 1/82* (2013.01); *F05D 2230/642* (2013.01); *F05D 2250/71* (2013.01); *Y02T 50/671* (2013.01)

(58) Field of Classification Search
CPC ..... F02K 1/40; F02K 1/82; F02K 1/80; F02K 1/00; F02C 7/20; F02C 7/32; F01D 25/30; F01D 25/28; F01D 25/243; F01D 25/246; F05D 2260/30; F05D 2240/90; F05D 2240/91; B64D 33/04
See application file for complete search history.

(56) References Cited

U.S. PATENT DOCUMENTS

| 4,987,736 A * | 1/1991 | Ciokajlo ................ F01D 9/065 415/138 |
| 5,299,760 A | 4/1994 | Finch et al. |
| 5,451,116 A * | 9/1995 | Czachor ................ F01D 9/065 403/338 |

(Continued)

FOREIGN PATENT DOCUMENTS

| EP | 2 719 868 A2 | 4/2014 |
| FR | 2 692 006 A1 | 12/1993 |

(Continued)

OTHER PUBLICATIONS

Oct. 29, 2015 Search Report issued in European Patent Application No. 15 16 7530.

(Continued)

*Primary Examiner* — Gerald L Sung
*Assistant Examiner* — William Breazeal
(74) *Attorney, Agent, or Firm* — Oliff PLC

(57) ABSTRACT

The present invention provides a support duct for a gas turbine engine. The supported duct comprises at least one support frame having an aperture defined by an upper aperture wall, a lower aperture wall and opposing aperture side walls. It further comprises a duct extending through aperture, the duct comprising an upper panel in abutment with the upper aperture wall, a lower panel in abutment with the lower aperture wall and opposing side walls extending between the upper and lower panels. The opposing side walls of the duct are spaced from the opposing aperture side walls.

11 Claims, 3 Drawing Sheets

(56) References Cited

U.S. PATENT DOCUMENTS

| | | |
|---|---|---|
| 9,399,924 B2 * | 7/2016 | Klingels .............. F01D 11/005 |
| 2006/0288707 A1 | 12/2006 | Weaver et al. |
| 2007/0001062 A1 | 1/2007 | Kirby |
| 2015/0143815 A1 * | 5/2015 | Salunkhe ............... F01D 25/28 60/796 |

FOREIGN PATENT DOCUMENTS

| | | |
|---|---|---|
| GB | 2280484 A | 2/1995 |
| WO | 01/92787 A1 | 12/2001 |

OTHER PUBLICATIONS

Dec. 19, 2014 Search Report issued in British Application No. GB1410586.0.

* cited by examiner

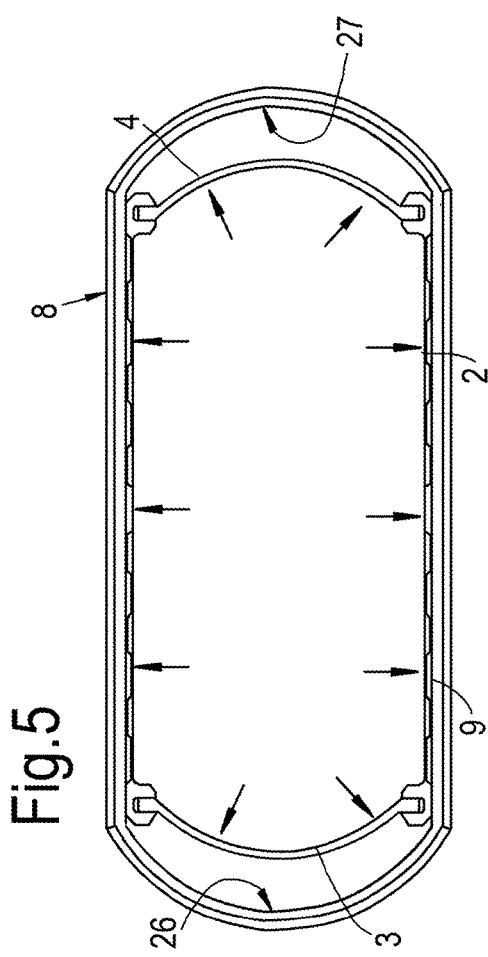
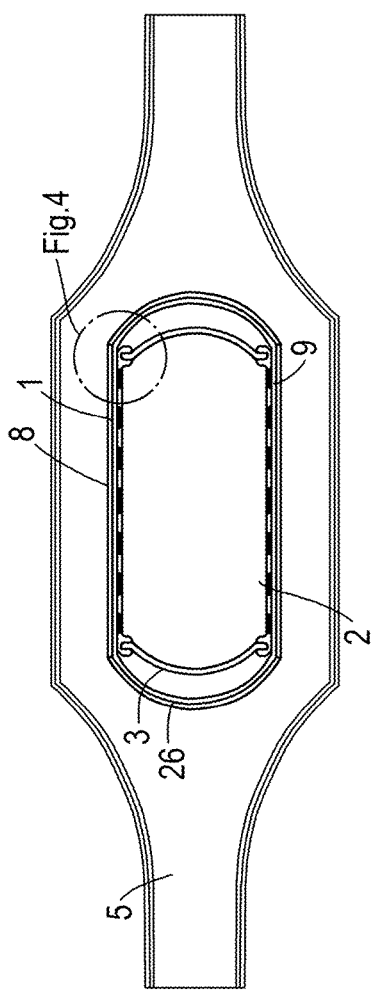
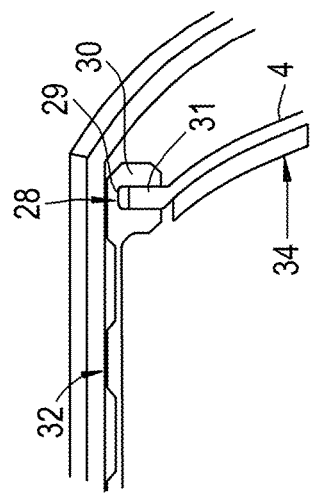

DUCT

FIELD OF THE INVENTION

The present invention relates to a duct for a gas turbine engine.

BACKGROUND OF THE INVENTION

With reference to FIG. 1, a two spool low bypass ratio engine is generally indicated at 10 and has a principal and rotational axis X-X. The engine comprises, in axial flow series, an air intake 11, a propulsive fan 12, a high-pressure compressor 14, combustion equipment 15, a high-pressure turbine 16, a low-pressure turbine 18, and an exhaust duct 19.

During operation, air entering the intake 11 is accelerated by the fan 12 to produce two air flows: a first air flow A into the high pressure compressor 14 and a second air flow B which passes through the bypass duct 22 to provide propulsive thrust. The high pressure compressor 14 compresses the air flow A directed into it.

The compressed air exhausted from the high-pressure compressor 14 is directed into the combustion equipment 15 where it is mixed with fuel and the mixture combusted. The resultant hot combustion products then expand through, and thereby drive the high and low-pressure turbines 16, 18 before being exhausted through the duct 19 to provide additional propulsive thrust. The high and low-pressure turbines respectively drive the high pressure compressor 14, and the fan 12 by suitable interconnecting shafts.

The exhaust duct 19 is typically circular in cross-section and therefore force concentrations and excessive hoop stress are avoided. The duct does not need additional support from the airframe and so the duct can be sufficiently isolated from the airframe to avoid any problems arising from differences in thermal expansion/contraction between the duct and airframe.

It is known to provide an exhaust duct with a non-circular cross-sectional profile. For example, in stealth applications it is desirable to reduce the radar visibility of the exhaust duct. A non-circular exhaust duct introduces additional hoop stresses which must either be accommodated by support from the airframe or the duct must be thickened or reinforcement in the form of stringers must be provided. The thickening/reinforcement increases manufacturing costs and engine operating costs due to the increased weight of material. Providing support from the airframe is problematic owing to the differences in thermal expansion/contraction between the exhaust duct and the airframe.

SUMMARY OF THE INVENTION

In a first aspect, the present invention provides a supported duct for a gas turbine engine, the supported duct comprising:
at least one support frame having an aperture defined by an upper aperture wall portion, a lower aperture wall portion and opposing aperture side walls extending between the upper and lower aperture wall portions,
a duct extending through the aperture, the duct comprising an upper panel in abutment with the upper aperture wall portion, a lower panel in abutment with the lower aperture wall portion and opposing side walls extending between the upper and lower panels,
wherein the opposing side walls of the duct are spaced from the opposing aperture side walls.

By providing a duct which is partly in abutment with the support frame, the support frame can support the duct to resist pressure from within the duct and deflections in the duct caused by externally applied loads. The spacing between the side walls of the duct and aperture allows lateral thermal expansion/contraction of the duct.

Optional features of the invention will now be set out. These are applicable singly or in any combination with any aspect of the invention.

In some embodiments, the opposing sidewalls of the duct are structurally distinct (disconnected) from the upper and/or lower panel(s), i.e. the opposing side walls are separate elements and not integral with the upper and/or lower panel(s). This allows the sidewalls of the duct to expand and contract independently from the panels.

In some embodiments, the duct comprises coupling elements to couple the opposing side walls of the duct to the upper and/or lower panel of the duct. Internal pressure exerted on the side walls of the duct is transferred to the upper and lower panels through coupling elements.

In some embodiments, the coupling elements may comprise axially elongated slots extending at least part way along the opposing axial extending edges of the upper and/or lower panel(s) for receiving the axially extending edges of the opposing side walls of the duct. The coupling elements may each comprise a slotted flange.

In some embodiments, the aperture is non-circular. In some embodiments, the aperture has a stadium-shaped axial cross-sectional profile.

In some embodiments, the upper aperture wall portion and the upper panel are substantially planar. In some embodiments, the lower aperture wall portion and the lower panel are substantially planar. In some embodiments, the opposing aperture walls and/or opposing side walls of the duct are arced.

In some embodiments, the radially outer surface of the upper and/or lower panel(s), i.e. the surface which is in abutment with the upper and lower aperture wall portions, is provided with at least one spacer e.g. pad or axially extending ridge/corrugation to provide an air gap between the upper and/or lower panel(s) and the respective abutting aperture wall portion to reduce thermal transfer from the duct to the support frame(s). The spacer(s) may comprise a low friction coating (e.g. polytetrafluoroethylene (PTFE)) to allow the duct to move axially within the aperture during thermal expansion/contraction. If a thermally insulating material is used, this will create a thermal break and further reduce the heat transfer from the duct to the airframe.

In some embodiments, at least a portion of at least one of the upper panel/lower panel and/or opposing side walls of the duct includes insulating material such as a ceramic (zirconia) e.g. on a radially inner or radially outer surface.

In some embodiments, at least one location pin is provided to prevent lateral movement of the duct relative to the support frame. The or each location pin may be fixed to one of the upper or lower panels and extend into a bore or an axial slot in the respective abutting aperture wall portion. The provision of a slot in the abutting aperture wall portion allows axial movement arising from thermal expansion whilst limiting lateral movement.

In some embodiments, there is a plurality of support frames, each having a respective aperture.

In some embodiments, the duct is a jet pipe or an exhaust duct e.g. an engine exhaust duct for a gas turbine engine and the support frame is an aircraft airframe.

In a second aspect, the invention provides a duct for a gas turbine engine, the duct comprising:

an upper panel,
a lower panel; and
opposing side walls extending between the upper and lower panels,
wherein the opposing side walls of the duct are disconnected from the upper and/or lower panels.

The opposing sidewalls of the duct are structurally distinct (disconnected) from the top and/or bottom panel(s), i.e. the opposing side walls are separate elements and not integral with the top and/or bottom panel(s). This allows the sidewalls of the duct to expand and contract independently to the panels.

In some embodiments, the duct comprises coupling elements to couple the opposing side walls of the duct to the upper and/or lower panel of the duct. Internal pressure exerted on the side walls of the duct is transferred to the upper and lower panels through coupling elements.

In some embodiments, the coupling elements may comprise axially elongated slots extending at least part way along the opposing axial extending edges of the upper and/or lower panel(s) for receiving the axially extending edges of the opposing side walls. The coupling elements may each comprise a slotted flange.

In some embodiments, the upper panel is substantially planar. In some embodiments, the lower panel is substantially planar. In some embodiments, the opposing side walls of the duct are arced.

In some embodiments, the radially outer surface of the upper and/or lower panel(s) is provided with at least one spacer e.g. pad or axially extending ridge/corrugation. The spacer(s) may comprise a low friction coating.

In some embodiments, at least a portion of at least one of the upper panel/lower panel and/or opposing side walls of the duct includes insulating material e.g. on a radially inner surface.

In some embodiments, the duct is jet pipe or an exhaust duct e.g. a core engine exhaust duct for a gas turbine engine and the support frame is an aircraft airframe.

In a third aspect, the present invention provides a gas turbine engine comprising a (supported) duct according to the first aspect or the second aspect.

References to "upper" and "lower" panels and wall portions are not intended to imply a required orientation of the duct/supported duct. Whilst in the preferred embodiment shown in the Figures below, the upper panel/wall portion is positioned vertically above the lower panel/wall portion, this is not a requirement of the invention and the upper panel/wall portion could, for example, be horizontally spaced from the lower panel/wall portion.

BRIEF DESCRIPTION OF THE DRAWINGS

Embodiments of the invention will now be described by way of example with reference to the accompanying drawings in which:

FIG. 3 shows an axial cross-section through the first embodiment;
FIG. 4 shows an enlarged portion of FIG. 3;
and
FIG. 5 shows the internal pressure in a portion of FIG. 3.

DETAILED DESCRIPTION AND FURTHER OPTIONAL FEATURES OF THE INVENTION

Figure 1:
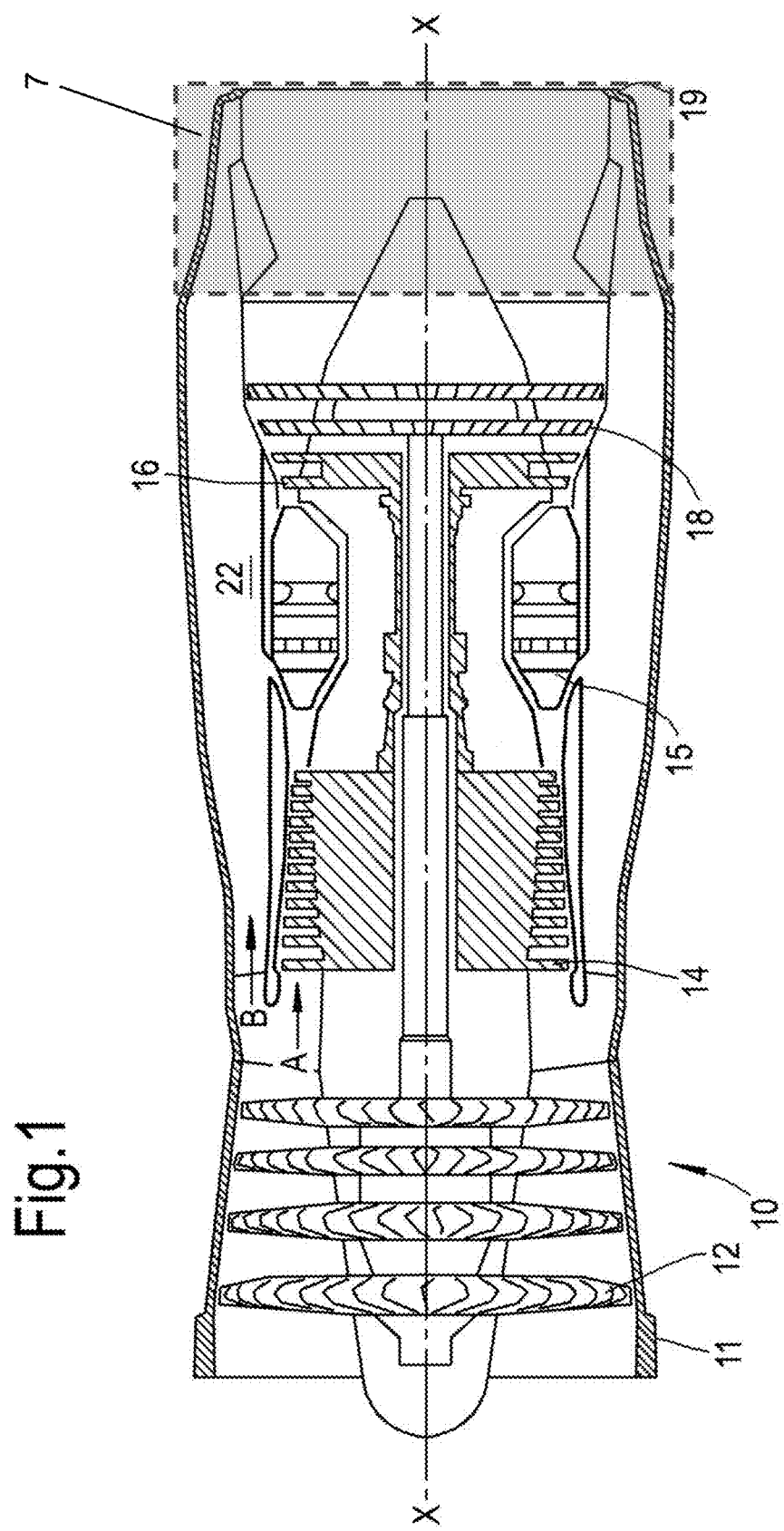
FIG. 1 shows a ducted fan gas turbine engine.
Figure 2:
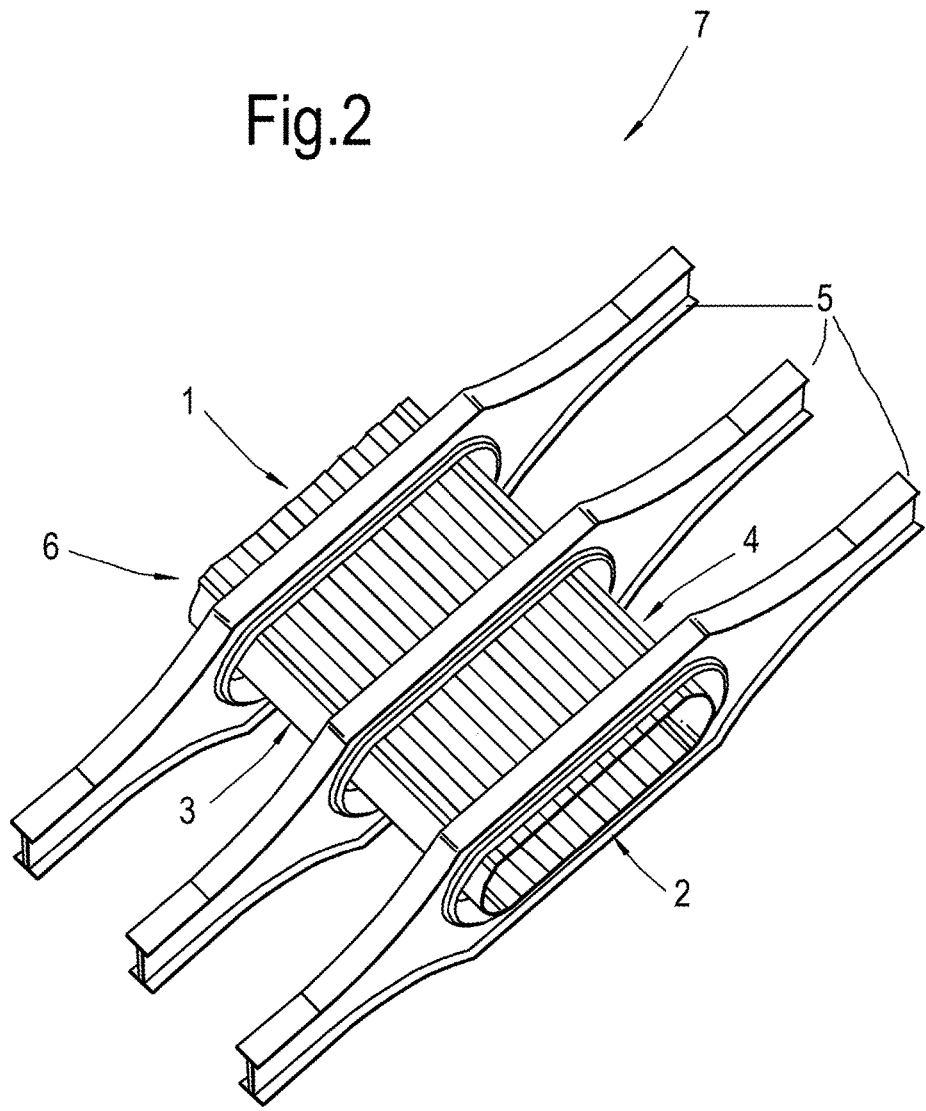
FIG. 2 shows a perspective view of a first embodiment of the present invention.

FIGS. 2-4 show a first embodiment of the present invention.

The supported duct 7 comprises a series of support frames 5 (which together make up part of an airframe of an aircraft). Each support frame has an aperture defined by an upper aperture wall portion 8, a lower aperture wall portion 9 and opposing aperture side walls 26, 27 extending between the upper and lower aperture wall portions 8, 9. The apertures have a non-circular, stadium-shaped axial cross-sectional profile as shown in FIG. 3. A engine exhaust (jet pipe) duct 6 extends through apertures. The duct 6 comprises a upper panel 1 in abutment with the upper aperture wall portion 8 and a lower panel 2 in abutment with the lower aperture wall portion 9. Opposing duct side walls 3, 4 extend between the upper and lower panels 1, 2.

The upper aperture wall portion 8 and the upper panel 1 are substantially planar. The lower aperture wall portion 9 and the lower panel 2 are substantially planar. The opposing aperture walls 26, 27 and opposing side walls 3, 4 of the duct 6 are arced.

The opposing side walls 3, 4 of the duct 6 are spaced from the opposing aperture side walls 26, 27.

The opposing sidewalls 3, 4 of the duct 6 are structurally distinct (disconnected) from the upper and lower panels, i.e. the opposing side walls 3, 4 are separate elements and not integral with the panels 1, 2. This allows the sidewalls 3, 4 of the duct to expand and contract independently from the panels 1, 2.

The duct comprises coupling elements 28 to couple the opposing side walls 3, 4 of the duct 6 to the upper and lower panels 1, 2 of the duct 6.

As shown in FIG. 4, the four coupling elements 28 each comprise an axially elongated slot 29 extending along a flange 30 provided along the opposing axial extending edges of the upper and lower panels 1, 2. The slots each receive the axially extending edges 31 of the opposing side walls 3, 4.

The radially outer surfaces of the upper and lower panels, i.e. the surfaces which are in abutment with the upper and lower aperture wall portions 8, 9, are provided with at least one spacer formed of an axially extending ridge 32 to provide air gaps 33 between the upper and lower panels 1, 2 and the respective abutting aperture wall portion 8, 9 to reduce thermal transfer from the duct 6 to the support frames 5. The spacers comprise a low friction coating to allow the duct 6 to move axially within the apertures.

The radially inner surfaces of the opposing side walls 3, 4 are provided with insulating material 34. Although not shown, the insulating material can also be provided on the radially inner surface of the upper and lower panels 1, 2.

As shown in FIG. 5, internal pressure applied to the upper and lower panels 1, 2 is transferred to and resisted by the upper and lower aperture wall portions 8, 9 of the support frames 5. Internal pressure applied to the opposing side walls 3, 4 of the duct 6 is transferred to the upper and lower panels 1, 2 through the coupling elements 28. Thermal expansion/contraction of the duct is accommodated by the spacing between the opposing side walls 3, 4 of the duct 6 and the opposing side walls 26, 27 of the aperture in the support frame 5.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A supported duct for a gas turbine engine, the supported duct comprising:
    at least one support frame having an aperture defined by an upper aperture wall portion, a lower aperture wall portion and opposing aperture side walls extending between the upper aperture wall portion and the lower aperture wall portion, an exhaust duct of the gas turbine engine extending through the aperture, the exhaust duct comprising an upper panel in abutment with the upper aperture wall portion, a lower panel in abutment with the lower aperture wall portion and opposing side walls extending between the upper panel and the lower panel,
    wherein the opposing side walls of the exhaust duct are spaced from the opposing aperture side walls.

2. The supported duct according to claim 1 wherein the opposing sidewalls of the exhaust duct are structurally distinct from the upper panel and/or the lower panel.

3. The supported duct according to claim 2 wherein the exhaust duct comprises coupling elements to couple the opposing side walls of the exhaust duct to the upper panel and/or the lower panel.

4. The supported duct according to claim 3 wherein the coupling elements comprise axially elongated slots extending at least part way along opposing axially extending edges of the upper panel and/or the lower panel for receiving axially extending edges of the opposing side walls.

5. The supported duct according to claim 1 wherein the aperture is non-circular.

6. The supported duct according to claim 1 wherein the upper aperture wall portion and the upper panel are planar.

7. The supported duct according to claim 1 wherein the lower aperture wall portion and the lower panel are planar.

8. The supported duct according to claim 1 wherein the opposing side and/or the opposing aperture side walls are arced.

9. The supported duct according to claim 1 wherein a respective radially outer surface of the upper panel and/or the lower panel which is in abutment with the respective upper aperture wall portion and/or lower aperture wall portion, is provided with at least one spacer to provide an air gap between the respective upper panel and/or the lower panel and the respective upper aperture wall portion and or lower aperture wall portion.

10. The supported duct according to claim 1 wherein at least a portion of at least one of the upper panel/lower panel and/or opposing side walls of the exhaust duct includes insulating material.

11. The supported duct according to claim 1 wherein there are a plurality of support frames, each having a respective aperture.

* * * * *